United States Patent
Bai (10) Patent No.: US 10,951,797 B2
(45) Date of Patent: Mar. 16, 2021

(54) ELECTRONIC DEVICE

(71) Applicant: GUANGDONG OPPO MOBILE TELECOMMUNICATIONS CORP., LTD., Guangdong (CN)

(72) Inventor: Jian Bai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 84 days.

(21) Appl. No.: 16/386,237

(22) Filed: Apr. 16, 2019

(65) Prior Publication Data
US 2019/0364185 A1 Nov. 28, 2019

(30) Foreign Application Priority Data
May 25, 2018 (CN) .......................... 201810515709.3

(51) Int. Cl.
*H04N 5/225* (2006.01)
*H04M 1/02* (2006.01)
*G06F 1/16* (2006.01)

(52) U.S. Cl.
CPC ..... *H04N 5/225251* (2018.08); *G06F 1/1615* (2013.01); *G06F 1/1686* (2013.01);
(Continued)

(58) Field of Classification Search
CPC .......... H04N 5/225251; H04N 5/2252; H04M 1/0264; H04M 1/0266; H04M 1/0225;
(Continued)

(56) References Cited

U.S. PATENT DOCUMENTS 6,751,473 B1 * 6/2004 Goyal ................. H04M 1/0247
348/E7.082
9,686,384 B2 6/2017 Song
(Continued)

FOREIGN PATENT DOCUMENTS

CN 101394433 3/2009
CN 203368530 12/2013
(Continued)

OTHER PUBLICATIONS

SIPO, Decision of Rejection for CN Application No. 201810515709.3, dated Mar. 27, 2020.
(Continued)

*Primary Examiner* — Nelson D. Hernández Hernández
(74) *Attorney, Agent, or Firm* — Hodgson Russ LLP (57) ABSTRACT

An electronic device includes a first display screen assembly having a first display portion; a second display screen assembly having a second display portion, the second display screen assembly being coupled with the first display screen assembly and being movable between a first position and a second position, in which the first display screen assembly and the second display screen assembly are not overlapped in a front-rear direction when the second display screen assembly moves between the first position and the second position; and a camera provided to the second display screen assembly and located at a rear side of the second display portion, in which the camera moves along with the movement of the second display screen assembly between the first position and the second position to capture images of different regions.

18 Claims, 6 Drawing Sheets

(52) U.S. Cl.
CPC ....... *H04M 1/0225* (2013.01); *H04M 1/0264* (2013.01); *H04M 1/0266* (2013.01); *H04N 5/2252* (2013.01); *H04M 2250/16* (2013.01); *H04M 2250/20* (2013.01)

(58) Field of Classification Search
CPC .......... H04M 2250/16; H04M 2250/20; G06F 1/1686; G06F 1/1615; G03B 17/04
See application file for complete search history.

(56) References Cited

U.S. PATENT DOCUMENTS

| | | | | |
|---|---|---|---|---|
| 2004/0257473 | A1* | 12/2004 | Miyagawa | H04N 7/144 |
| | | | | 348/571 |
| 2005/0150080 | A1 | 7/2005 | Lu et al. | |
| 2005/0153668 | A1* | 7/2005 | Lee | H04M 1/0214 |
| | | | | 455/90.3 |
| 2013/0182062 | A1 | 7/2013 | Son et al. | |
| 2015/0042873 | A1 | 2/2015 | Hunt | |
| 2016/0044804 | A1 | 2/2016 | Nakamura | |
| 2016/0165023 | A1* | 6/2016 | Song | H04M 1/0208 |
| | | | | 455/566 |

FOREIGN PATENT DOCUMENTS

| | | |
|---|---|---|
| CN | 203387566 | 1/2014 |
| CN | 203537435 | 4/2014 |
| CN | 204131577 | 1/2015 |
| CN | 204216968 | 3/2015 |
| CN | 204859235 | 12/2015 |
| CN | 106713546 | 5/2017 |
| CN | 206251215 | 6/2017 |
| CN | 106921767 | 7/2017 |
| CN | 206433032 | 8/2017 |
| CN | 107911514 | 4/2018 |
| CN | 207283616 | 4/2018 |
| CN | 108632414 | 10/2018 |
| CN | 108833627 | 11/2018 |
| CN | 208386645 | 1/2019 |
| EP | 1553748 | 7/2005 |
| EP | 2456174 | 5/2012 |
| KR | 20170089055 | 8/2017 |
| WO | 2007047685 | 4/2007 |

OTHER PUBLICATIONS

SIPO, First Office Action for CN Application No. 201810515709.3, dated Aug. 21, 2019.

WIPO, English translation of the ISR and WO for PCT/CN2019/082110, dated Jun. 27, 2019.

EPO, Office Action for EP Application No. 19169831.5, dated Nov. 5, 2019.

IPI, Office Action for IN Application No. 201914015935, dated Oct. 23, 2020.

* cited by examiner

ELECTRONIC DEVICE

CROSS-REFERENCE TO RELATED APPLICATION

This application claims priority to Chinese Patent Application No. 201810515709.3, filed May 25, 2018, the entire disclosure of which is incorporated herein by reference.

FIELD

The present disclosure relates to a technical field of communication apparatus, and more particularly to an electronic device.

BACKGROUND

In the related art, in order to satisfy a requirement for different photographing angles, an electronic device usually needs to be provided with a plurality of cameras, which will increase the production cost.

SUMMARY

The present disclosure aims to solve at least one of the problems existing in the related art to at least some extent.

The electronic device according to embodiments of the present disclosure includes: a first display screen assembly including a first display portion configured to provide display information; a second display screen assembly including a second display portion configured to provide display information, the second display screen assembly being coupled with the first display screen assembly and being movable between a first position where a front side of the second display portion faces forwards and constitutes a display zone together with the first display portion to provide display information, and a second position where a rear side of the second display portion faces forwards, in which the first display screen assembly and the second display screen assembly are not overlapped in a front-rear direction when the second display screen assembly moves between the first position and the second position.

The electronic device according to embodiments of the present disclosure includes: a first display screen assembly including a first display portion configured to provide display information; and a second display screen assembly including a second display portion configured to provide display information. The second display screen assembly is coupled with the first display screen assembly, the second display screen assembly is movable with respect to the first display screen assembly between a first position where the second display portion has a first orientation identical to an orientation of the first display portion to constitute a display zone of the electronic device, and a second position where the second display portion has a second orientation opposite to the orientation of the first display portion; the first display screen assembly and the second display screen assembly are not overlapped along the orientation of the first display portion when the second display screen assembly moves between the first position and the second position.

The electronic device according to embodiments of the present disclosure includes: a first display screen assembly including a first display screen, and a second display screen assembly including a second display screen. The first display screen has a first display portion, and the second display screen has a second display portion. The second display screen assembly is coupled with the first display screen assembly, the second display screen assembly is movable with respect to the first display screen assembly between a first position where the second display screen has a first orientation identical to an orientation of the first display screen so as to enable the first display portion and the second display portion to cooperatively constitute a display zone of the electronic device, and a second position where the second display screen has a second orientation opposite to the orientation of the first display screen; the first display screen assembly and the second display screen assembly are not overlapped along the orientation of the first display screen when the second display screen assembly moves between the first position and the second position.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail and examples of the embodiments will be illustrated in the drawings. The same or similar elements and the elements having same or similar functions are denoted by like reference numerals throughout the description. The embodiments described herein with reference to drawings are explanatory, which are merely used to illustrate the present disclosure, but shall not be construed to limit the present disclosure.

In the specification, it is to be understood that terms such as "upper," "lower," "front," "rear," "left," "right," "vertical," "horizontal," "top," "bottom," "inner," "outer," "clockwise," "counterclockwise," "axial," "radial" and "circumferential" should be construed to refer to the orientation or position relationship as then described or as shown in the drawings under discussion. These relative terms are for convenience of description and do not indicate or imply that the present disclosure must have a particular orientation or be constructed and operated in a particular orientation. Thus, these relative terms should not be constructed to limit the present disclosure. In the description of the present disclosure, the term "a plurality of" means two or more than two, unless specified otherwise.

In the present disclosure, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications of two elements or interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

As illustrated in FIGS. 1-4, an electronic device 100 according to embodiments of the present disclosure according to embodiments of the present disclosure includes a first display screen assembly 1 including a first display portion 111 configured to provide display information; and a second display screen assembly 2 including a second display portion 211 configured to provide display information, the second display screen assembly 2 being coupled with the first display screen assembly 1, in which the second display screen assembly 2 is movable with respect to the first display screen assembly 1 between a first position where the second display portion 211 has a first orientation identical to an orientation of the first display portion 111 to constitute a display zone of the electronic device 100, and a second position where the second display portion 211 has a second orientation opposite to the orientation of the first display portion 111; the first display screen assembly 1 and the second display screen assembly 2 are not overlapped along the orientation of the first display portion 111 when the second display screen assembly 2 moves between the first position and the second position.

As illustrated in FIGS. 1-4, an electronic device 100 according to embodiments of the present disclosure includes: a first display screen assembly 1 including a first display screen 11, the first display screen 11 having a first display portion 111; and a second display screen assembly 2 including a second display screen 21, the second display screen 21 having a second display portion 211, the second display screen assembly 2 being coupled with the first display screen assembly 1, in which the second display screen assembly 2 is movable with respect to the first display screen assembly 1 between a first position where the second display screen 21 has a first orientation identical to an orientation of the first display screen 11 so as to enable the first display portion 111 and the second display portion 211 to cooperatively constitute a display zone of the electronic device 100, and a second position where the second display screen 21 has a second orientation opposite to the orientation of the first display screen 11; the first display screen assembly 1 and the second display screen assembly 2 are not overlapped along the orientation of the first display screen 11 when the second display screen assembly 2 moves between the first position and the second position.

An electronic device 100 according to embodiments of the present disclosure will be described below with reference to FIGS. 1-6.

As illustrated in FIGS. 1-4, the electronic device 100 according to embodiments of the present disclosure includes a first display screen assembly 1, a second display screen assembly 2, and a camera 3.

Figure 1:
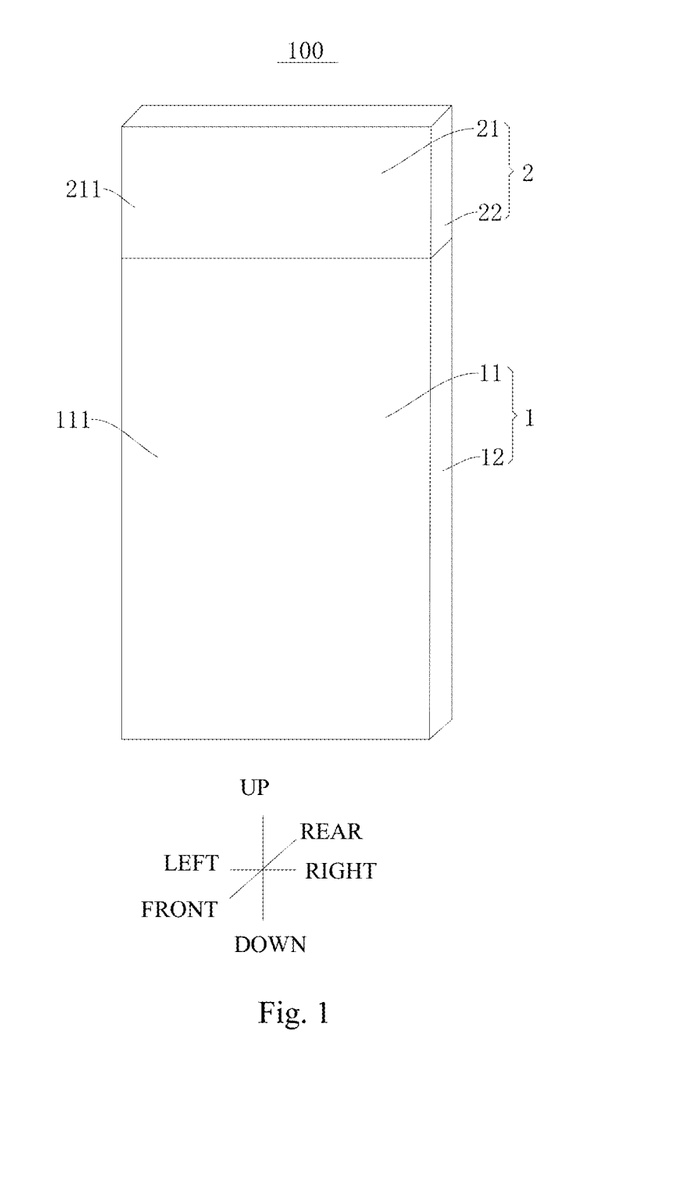
FIG. 1 illustrates a schematic view of an electronic device according to an embodiment of the present disclosure, in which a connecting member is in an accommodated state and a second display screen assembly is in a first position.
Figure 4:
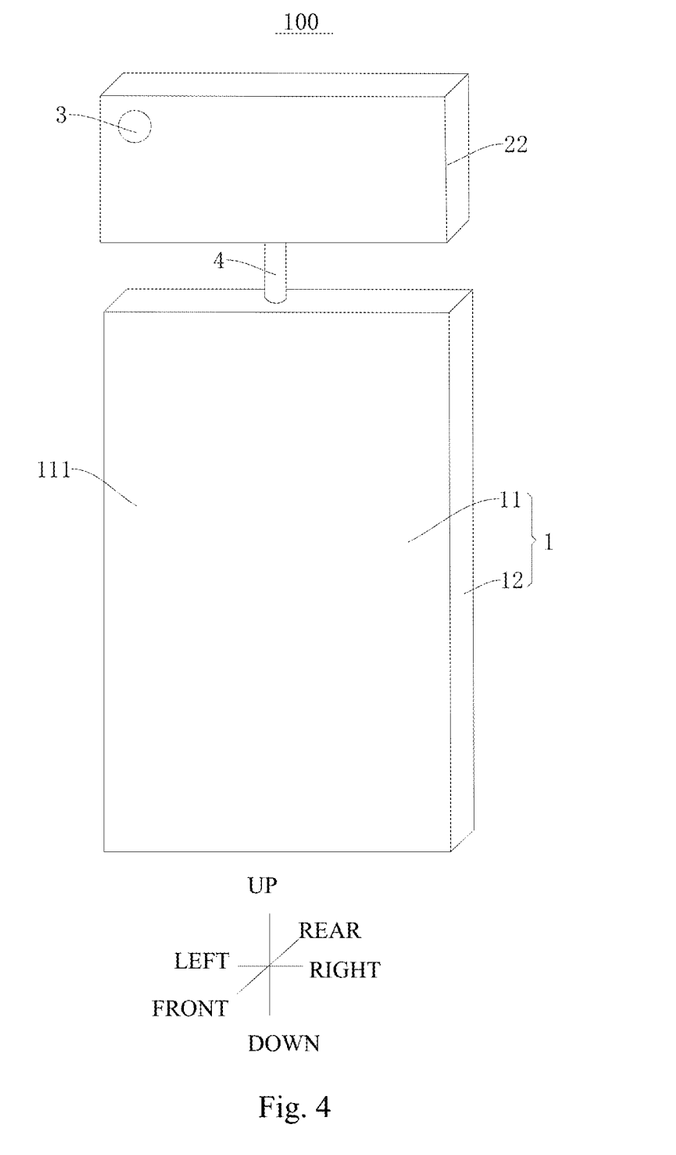
FIG. 4 illustrates a schematic view of an electronic device according to an embodiment of the present disclosure, in which a connecting member is in an exposed state and a second display screen assembly is in a second position.

The first display screen assembly 1 includes a first display portion 111 configured to provide a user with display information. The second display screen assembly 2 includes a second display portion 211 configured to provide the user with display information. The second display screen assembly 2 is coupled with the first display screen assembly 1 and is movable between a first position and a second position. In the first position, referring to FIG. 1, the second display portion 211 has a front side facing forwards and constituting, together with the first display portion 111, a display zone to provide display information to the user. In the second position, the second display portion 211 has a rear side facing forwards. Specifically, the first display portion 111 faces forwards to be opposite to the user, and as illustrated in FIG. 1, when the second display screen assembly 2 is in the first position, the second display portion 211 also faces forwards, such that the first display portion 111 and the second display portion 211 can cooperatively constitute the display zone configured to provide the display information to the user. When the second display screen assembly 2 is in the second position, as illustrated in FIG. 4, the first display portion 111 still faces forwards, but the second display portion 211 faces backwards.

The camera 3 is provided to the second display screen assembly 2 and located at the rear side of the second display portion 211. The camera 3 moves along with the movement of the second display screen assembly 2 between the first position and the second position, so as to capture images of different regions. Specifically, when the second display screen assembly 2 moves, the orientation of the second display portion 211 will change and hence the orientation of the lens of the camera 3 will also change, to allow the camera 3 to capture images of different regions.

It should be noted that the first display portion 111 and the second display portion 211 each include a plurality of pixel units, and each pixel unit includes three sub-pixels R, G, and B, each sub-pixel can be independently controlled to be turned on or turned off, such that three kinds of sub-pixels—red, green and blue—can be combined into various colors and patterns. Thus, the first display portion 111 and the second display portion 211 can exhibit various interfaces to provide the user with the display information. It could be understood that the user can receive information displayed on the first display portion 111 and the second display portion 211, and when the first display portion 111 and the second display portion 211 display manipulation information (for example, photographing, videoing, photo retouching, etc.), the user can operate on the first display portion 111 and the second display portion 211 to select a desired function.

The electronic device 100 may have a plurality of display modes. For example, only the first display portion 111 functions to display; only the second display portion 211 functions to display; or the first display portion 111 and the second display portion 211 both function to display, which display mode may also include the following three situations:

1) The first display portion 111 and the second display portion 211 collectively exhibit a complete user interface, in which case the electronic device 100 has a large display zone, thereby upgrading the user's visual experience;

2) The first display portion 111 and the second display portion 211 can individually exhibit a complete user interface, and the user interface exhibited by the first display portion 111 is identical to the user interface exhibited by the second display portion 211. In such a case the user can receive the display information via the first display portion 111 or via the second display portion 211, and when the first display portion 111 and the second display portion 211 are differently oriented, the user can receive the display information from different orientations, and hence the process of receiving information by the user is more flexible;

3) The first display portion 111 and the second display portion 211 can individually exhibit a complete user interface, and the user interface exhibited by the first display portion 111 is different from the user interface exhibited by the second display portion 211. Thus, the user can receive different information at the same time.

Optionally, the switch among the display modes of the electronic device 100 may depend on the position of the second display screen assembly 2 with respect to the first display screen assembly 1. For example, the electronic device 100 can further include a detection device and a switch device. The detection device is configured to detect the position of the second display screen assembly 2 and is coupled with the switch device. The switch device is configured to switch the display mode of the electronic device 100 according to the position of the second display screen assembly 2 detected by the detection device.

For example, when the second display screen assembly 2 is in the first position, referring to FIG. 1, the first display portion 111 and the second display portion 211 both face forwards, such that the first display portion 111 and the second display portion 211 of the electronic device 100 can collectively exhibit a complete user interface. For instance, when the electronic device 100 works in a photographing state, the first display portion 111 and the second display portion 211 collectively exhibit an image captured by the camera 3 as well as the manipulation information; when the electronic device 100 works in a non-photographing state (e.g., playing videos or games, browsing webpages, etc.), the first display portion 111 and the second display portion 211 collectively exhibit a video interface, a game interface, a webpage interface, or the like. In such a case, the electronic device 100 has a large display zone, and the user has excellent visual experience.

When the second display screen assembly 2 is in the second position, referring to FIG. 4, the first display portion 111 faces forwards, and the second display portion 211 faces backwards, such that the first display portion 111 and the second display portion 211 of the electronic device 100 can individually exhibit the same user interface, to allow the user to receive the display information from different orientations. For example, when the electronic device 100 works in the photographing state and the photographer and the photographed are two persons, the photographer is located in a position opposite to the first display portion 111, the photographed is located in a position opposite to the second display portion 211, and the first display portion 111 and the second display portion 211 both exhibit the image captured by the camera 3 as well as the manipulation information, such that the photographer can receive the image captured by the camera 3 through the first display portion 111 and operate on the first display portion 111, and the photographed can receive the image captured by the camera 3 through the second display portion 211 and adjust his/her posture according to the image received by the second display portion 211. When the photographed is at a small distance from the second display portion 211, the photographed also can operate on the second display portion 211. Certainly, the first display portion 111 and the second display portion 211 can individually exhibit different user interfaces. For example, when the electronic device 100 works in the photographing state and the photographer and the photographed are two persons, the photographer is located in the position opposite to the first display portion 111, the photographed is located in the position opposite to the second display portion 211, the first display portion 111 exhibits the image captured by the camera 3 as well as the manipulation information while the second display portion 211 only exhibits the image captured by the camera 3. In such a case, the photographer can receive the image captured by the camera 3 through the first display portion 111 and operate on the first display portion 111, but the photographed can only receive the image captured by the camera 3 through the second display portion 211 and thereby adjust his/her posture.

In addition, when the second display screen assembly 2 moves between the first position and the second position, the first display screen assembly 1 and the second display screen assembly 2 are not overlapped in a front-rear direction. Thus, when the second display screen assembly 2 moves, the first display portion 111 and the second display portion 211 do not block each other, thereby ensuring the area of the display zone of the electronic device 100 as well as the integrity of the display zone.

For the electronic device 100 according to the embodiments of the present disclosure, since the second display screen assembly 2 is movable, and the camera 3 may move along with the movement of the second display screen assembly 2, the camera 3 can capture images of different regions to enable the electronic device 100 of the present disclosure to satisfy the requirement for different photographing angles through only one camera 3, thereby lowering the production cost. In addition, when the second display screen assembly 2 moves between the first position and the second position, the first display screen assembly 1 and the second display screen assembly 2 are not overlapped in the front-rear direction, such that when the second display screen assembly 2 moves, the first display portion 111 and the second display portion 211 do not block each other, thereby ensuring the area of the display zone of the electronic device 100 as well as the integrity of the display zone.

It should be noted that the orientations referenced in the description of various components of the electronic device 100 in the present disclosure are based on the form of the second display screen assembly 2 in the first position. The term "front" in the present disclosure refers to one side of the first display portion 111 or the second display portion 211 facing the user, and the term "rear" refers to the side of the first display portion 111 or the second display portion 211 facing away from the user. The term "down" refers to a direction of gravity of the electronic device 100, and the term "above" refers to a direction opposite to the direction of gravity.

In an embodiment of the present disclosure, referring to FIGS. 1-4, the camera 3 has a lens facing away from the second display portion 211, that is, the camera 3 faces the rear side of the second display portion 211 to capture images. When the second display screen assembly 2 is in the first position, as illustrated in FIG. 1, the second display portion 211 faces forwards, the lens of the camera 3 faces backwards, and the camera 3 can capture an image of an region located at a rear side of the electronic device 100, that is, the camera 3 is used as a rear camera 3. At this time, the first display portion 111 and the second display portion 211 can collectively constitute a complete display zone to exhibit image information acquired by the camera 3.

When the second display screen assembly 2 is in the second position, as illustrated in FIG. 4, the second display portion 211 faces backwards, and the camera 3 faces forwards and may capture an image of a region located at a rear side of the electronic device 100, that is, the camera 3 is used as a front camera 3. At this time, it is possible to only control the first display portion 111 to work and present the image information acquired by the camera 3.

Since the lens of the camera 3 is arranged facing away from the second display portion 211, it is not necessary to reserve space for image acquisition in a plane where the second display portion 211 is located. For example, it is not necessary to provide a through hole or a transparent area in the plane where the second display portion 211 is located, thereby increasing the screen-to-body ratio. When the second display screen assembly 2 is in the first position, the electronic device 100 can realize a full-screen effect.

In an embodiment of the present application, the lens of the camera 3 is arranged towards the second display portion 211, that is, the camera 3 acquires images through the second display portion 211 towards the front side of the second display portion 211. When the second display screen assembly 2 is in the first position, the second display portion 211 faces forwards, and the lens of the camera 3 also faces forwards, such that the camera 3 acquires an image of the region located at the front side of the electronic device 100, and the camera 3 serves as a front camera 3. At this time, the first display portion 111 and the second display portion 211 can collectively constitute a complete display zone to present image information acquired by the camera 3.

When the second display screen assembly 2 is in the second position, the second display portion 211 faces backwards, and the lens of the camera 3 also faces backwards, such that the camera 3 can acquire an image of the region located at the rear side of the electronic device 100 and the camera 3 serves as a rear camera 3. At this time, the first display portion 111 and the second display portion 211 can individually display image information acquired by the camera 3, such that the photographer can receive the image acquired by the camera 3 through the first display portion 111 and operate on it, and the photographed can receive the image acquired by the camera 3 through the second display portion 211 and adjust his/her posture according to the received image.

The camera 3 acquires images directly through the second display portion 211, so that no space needs to be reserved for image acquisition in the plane where the second display portion 211 is located. For example, it is not necessary to provide a through hole or a transparent area in the plane where the second display portion 211 is located, thereby increasing the screen-to-body ratio. When the second display screen assembly 2 is in the first position, the electronic device 100 can realize the full-screen effect.

Further, the transmittance of an area of the second display portion 211 opposite to the lens is higher than that of the remaining part. That is, the area of the second display portion 211 opposite to the lens has a smaller pixel density than the remaining part, thereby reducing the interference of the pixel units on the second display portion 211 in the camera 3 during photographing to ensure the quality of photographing.

Furthermore, when the camera 3 acquires images through the second display portion 211, at least one pixel unit in the area of the second display portion 211 opposite to the lens is turned off, to further prevent the pixel units of the second display portion 211 from interfering with the image acquisition, so as to ensure the quality of photographing.

In an embodiment of the present disclosure, referring to FIGS. 1-4, the second display screen assembly 2 is rotatably coupled to an outer peripheral wall of the first display screen assembly 1 about a normal direction of the outer peripheral wall of the first display screen assembly 1, so as to be movable between the first position and the second position. Specifically, the second display screen assembly 2 is coupled to the outer peripheral wall of the first display screen assembly 1, and is rotatable about the normal direction of the outer peripheral wall of the first display screen assembly 1 to move between the first position and the second position. For instance, in an example shown in FIGS. 1-4, the outer peripheral wall of the first display screen assembly 1 includes a top wall and a bottom wall arranged oppositely in an up-down direction, and a left side wall and a right side wall arranged oppositely in a left-right direction. The normal directions of the top wall and the bottom wall extend in the vertical direction, and the normal directions of the left side wall and the right side wall extend in the horizontal direction. The second display screen assembly 2 is arranged on the top wall of the first display screen assembly 1 and is rotatable around the vertical direction. The second display screen assembly 2 can be rotated by 180° from the first position shown in FIG. 1 to move to the second position shown in FIG. 4. Likewise, the second display screen assembly 2 can be rotated by 180° from the second position shown in FIG. 4 to move to the first position shown in FIG. 1.

It could be understood that, as the second display screen assembly 2 moves between the first position and the second position, the camera 3 can not only capture images of the regions located at the front side and the rear side of the electronic device 100, but also achieve other photographing angles by controlling the angle at which the second display screen assembly 2 is rotated. For example, when the second display screen assembly 2 is rotated 90° or 270° counterclockwise from the position shown in FIG. 1, the camera 3 can capture image of a region located at a left side or a right side of the electronic device 100.

Figure 2:
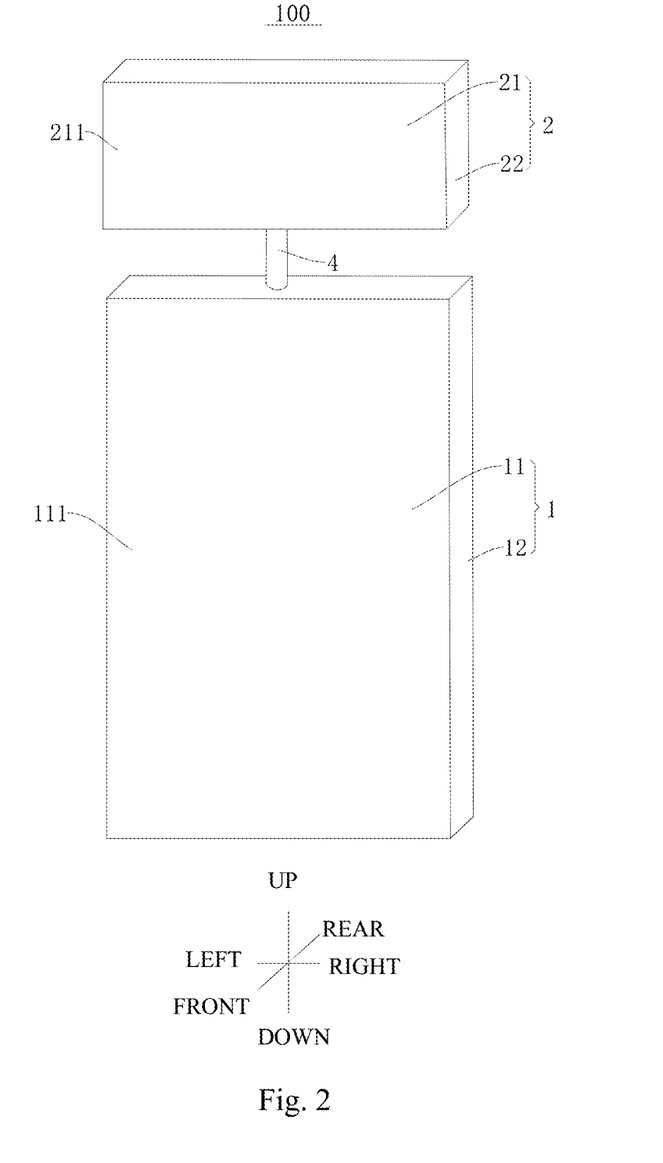
FIG. 2 illustrates a schematic view of an electronic device according to an embodiment of the present disclosure, in which a connecting member is in an exposed state and a second display screen assembly is in a first position.
Figure 3:
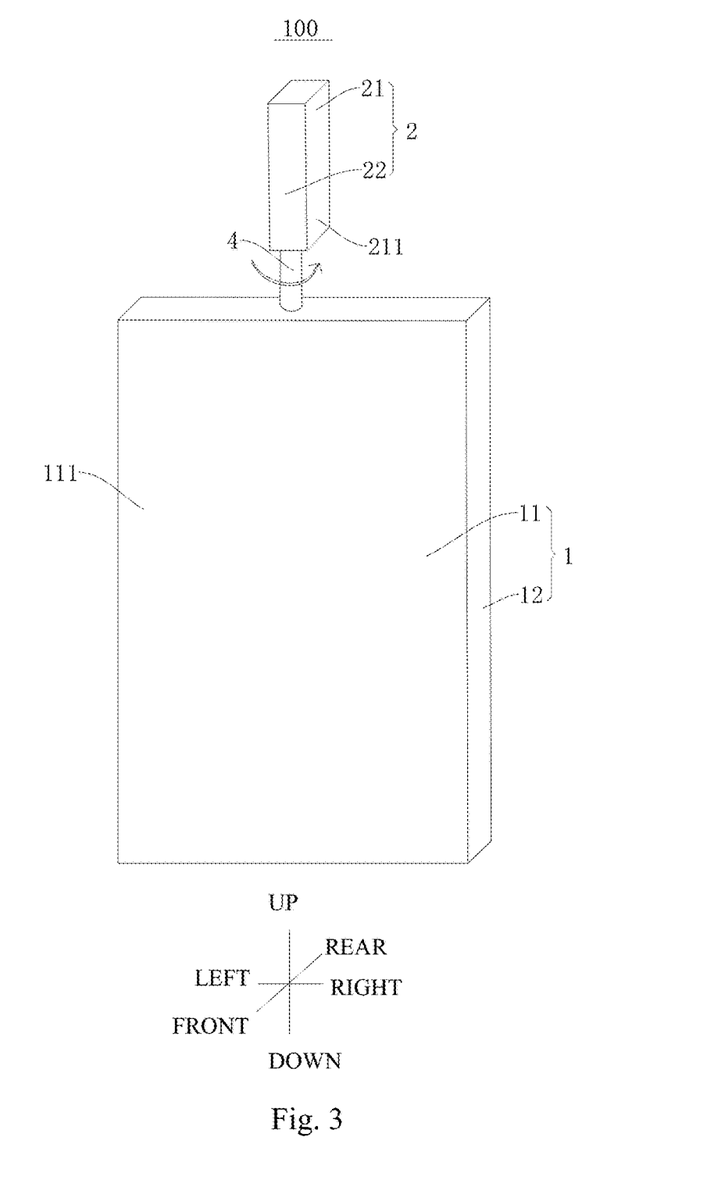
FIG. 3 illustrates a schematic view of an electronic device according to an embodiment of the present disclosure, in which a connecting member is in an exposed state and a second display screen assembly is moving from a first position to a second position.

In an embodiment of the present disclosure, referring to FIGS. 2-4, the electronic device 100 can also include a connecting member 4 extending along the normal direction of the outer peripheral wall of the first display screen assembly 1, and the first display screen assembly 1 and the second display screen assembly 2 are coupled by means of the connecting member 4.

Further, the connecting member 4 is rotatable with respect to at least one of the first display screen assembly 1 and the second display screen assembly 2. In some examples, the connecting member 4 can only rotate with respect to the first display screen assembly 1, and the connecting member 4 cannot rotate with respect to the second display screen assembly 2. Thus, the rotation of the second display screen assembly 2 with respect to the first display screen assembly 1 can be realized by the rotation of the connecting member 4 with respect to the first display screen assembly 1.

In some examples, the connecting member 4 can only rotate with respect to the second display screen assembly 2, and the connecting member 4 cannot rotate with respect to the first display screen assembly 1. Thus, the rotation of the second display screen assembly 2 with respect to the first display screen assembly 1 can be realized by the rotation of the second display screen assembly 2 with respect to the connecting member 4.

In some examples, the connecting member 4 can not only rotate with respect to the first display screen assembly 1, but also rotate with respect to the second display screen assembly 2. Thus, the rotation of the second display screen assembly 2 with respect to the first display screen assembly 1 can be realized by the rotation of the connecting member 4 with respect to the first display screen assembly 1 or by the rotation of the connecting member 4 with respect to the second display screen assembly 2, and the movement process of the second display screen assembly 2 between the first position and the second position becomes more flexible.

Further, the electronic device 100 also includes a drive motor. The drive motor is coupled with the connecting member 4 to drive the connecting member 4 to rotate, thereby driving the second display screen assembly 2 to move between the first position and the second position. Thus, the movement process of the second display screen assembly 2 becomes more automatized.

In an embodiment of the present disclosure, the connecting member 4 has an accommodated state where the connecting member 4 is accommodated in the first display screen assembly 1 and/or the second display screen assembly 2 (as illustrated in FIG. 1) and an exposed state where the connecting member 4 is exposed from the first display screen assembly 1 and the second display screen assembly 2 (as illustrated in FIGS. 2-4). In the accommodated state, the first display screen assembly 1 and the second display screen assembly 2 are spliced together, and in the exposed state, the first display screen assembly 1 is spaced apart from the second display screen assembly 2.

Specifically, referring to FIG. 1, when the second display screen assembly 2 is in the first position, the connecting member 4 can be in the accommodated state, and at this time, the first display portion 111 and the second display portion 211 can be spliced together and collectively constitute the display zone with a good display effect. When the electronic device 100 is in the photographing state and needs to change the photographing angle of the camera, that is, the second display screen assembly 2 is required to move from the first position to the second position, the connecting member 4 can come into the exposed state to space the first display screen assembly 1 apart from the second display screen assembly 2 (as illustrated in FIG. 2), and then the connecting member 4 is driven to rotate with respect to the first display screen assembly 1 or the second display screen assembly 2 to drive the second display screen assembly 2 to move to the second position. That is, during the movement of the second display screen assembly 2, the connecting member 4 is in the exposed state, and the first display screen assembly 1 and the second display screen assembly 2 are spaced apart from each other to avoid friction generated between the first display screen assembly 1 and the second display screen assembly 2.

In an embodiment of the present disclosure, the connecting member 4 includes a first fitting segment and a second fitting segment coupled with each other, in which the first fitting segment is coupled with the first display screen assembly 1, and the second fitting segment is coupled with the second display screen assembly 2. The first display screen assembly 1 is provided with a first fitting groove and the first fitting segment is slidably fitted in the first fitting groove; and/or the second display screen assembly 2 is provided with a second fitting groove and the second fitting segment is slidably fitted in the second fitting groove. In such a way, the connecting member 4 can be switched between the accommodated state and the exposed state.

Specifically, in some examples, the first display screen assembly 1 is provided with the first fitting groove, and the first fitting segment is slidably fitted in the first fitting groove, such that the connecting member 4 can be switched between the accommodated state and the exposed state. The first fitting segment is fitted in the first fitting groove and can slide in the first fitting groove to stretch or retract with respect to the first fitting groove. When the first fitting segment slides inwardly in the first fitting groove and becomes completely located in the first fitting groove, the connecting member 4 is in the accommodated state. When the first fitting segment slides outwardly in the first fitting groove and extends out of the first fitting groove, the connecting member 4 is in the exposed state.

In some examples, the second display screen assembly 2 is provided with the second fitting groove, and the second fitting segment is slidably fitted in the second fitting groove, such that the connecting member 4 can be switched between the accommodated state and the exposed state. The second fitting segment is fitted in the second fitting groove and can slide in the second fitting groove to stretch or retract with respect to the second fitting groove. When the second fitting segment slides inwardly in the second fitting groove and becomes completely located in the second fitting groove, the connecting member 4 is in the accommodated state. When the second fitting segment slides outwardly in the second fitting groove and extends out of the second fitting groove, the connecting member 4 is in the exposed state.

In some examples, the first display screen assembly 1 is provided with the first fitting groove, the first fitting segment is slidably fitted in the first fitting groove; while the second display screen assembly 2 is provided with the second fitting groove, and the second fitting segment is slidably fitted in the second fitting groove, such that the connecting member 4 can be switched between the accommodated state and the exposed state.

Optionally, the first fitting groove is provided with an internal thread, the first fitting segment is provided with an external thread meshing with the internal thread, and the first fitting segment can stretch or retract in the first fitting groove by rotating the connecting member 4 or the first display screen assembly 1, which can not only implement the switch of the connecting member 4 between the accommodated state and the exposed state, but also implement the switch of the second display screen assembly 2 between the first position and the second position. In addition, since the internal thread and the external thread mesh with each other, the first fitting segment and the first fitting groove can be prevented from being relatively displaced under the action of gravity.

Optionally, the second fitting groove is provided with an internal thread, the second fitting segment is provided with an external thread meshing with the internal thread, and the second fitting segment can stretch or retract in the second fitting groove by rotating the connecting member 4 or the second display screen assembly 2, which can not only implement the switch of the connecting member 4 between the accommodated state and the exposed state, but also implement the switch of the second display screen assembly 2 between the first position and the second position. In addition, since the internal thread and the external thread mesh with each other, the second fitting segment and the second fitting groove can be prevented from being relatively displaced under the action of gravity.

In an embodiment of the present disclosure, the connecting member 4 includes a first fitting segment and a second fitting segment coupled with each other, the first fitting segment is coupled with the first display screen assembly 1, and the second fitting segment is coupled with the second display screen assembly 2. One of the first fitting segment and the second fitting segment is telescopically embedded in the other of the first fitting segment and the second fitting segment to switch the connecting member 4 between the accommodated state and the exposed state. Specifically, in some examples, the first fitting segment is telescopically embedded in the second fitting segment; in some examples, the second fitting segment is telescopically embedded in the first fitting segment. Through the relative stretch and retraction of the first fitting segment and the second fitting segment, the connecting member 4 can be switched between the accommodated state and the exposed state.

In an embodiment of the present disclosure, referring to FIGS. 1-4, the second display screen assembly 2 is provided above the first display screen assembly 1.

In an embodiment of the present disclosure, the second display screen assembly 2 is provided below the first display screen assembly 1.

In an embodiment of the present disclosure, the second display screen assembly 2 is provided at a left side of the first display screen assembly 1.

In an embodiment of the present disclosure, the second display screen assembly 2 is provided at a right side of the first display screen assembly 1.

In an embodiment of the present disclosure, one of the first display screen assembly 1 and the second display screen assembly 2 is formed as a closed ring structure, and is provided around an outer peripheral wall of the other of the first display screen assembly 1 and the second display screen assembly 2. Specifically, in some examples, the first display screen assembly 1 is formed as a closed ring structure and provided around an outer peripheral wall of the second display screen assembly 2; in some examples, the second display screen assembly 2 is formed as a closed ring structure and provided around an outer peripheral wall of the first display screen assembly 1. Thus, the structure of the electronic device 100 is diversified.

In an embodiment of the present disclosure, one of the first display screen assembly 1 and the second display screen assembly 2 is formed as a notched ring structure, and is provided around a partial outer peripheral wall of the other of the first display screen assembly 1 and the second display screen assembly 2. Specifically, in some examples, the first display screen assembly 1 is formed as a notched ring structure and provided around a partial outer peripheral wall of the second display screen assembly 2; in some examples, the second display screen assembly 2 is formed as a notched ring structure and provided around a partial outer peripheral wall of the first display screen assembly 1. Thus, the structure of the electronic device 100 is diversified.

In an embodiment of the present disclosure, the first display screen assembly 1 includes a first display screen 11 and a first housing 12. The first display screen 11 has the first display portion 111, and the first display screen 11 is assembled in the housing 12.

In an embodiment of the present disclosure, the second display screen assembly 2 includes a second display screen 21 and a second housing 22. The second display screen 21 has the second display portion 211, and the second display screen 21 is assembled in the second housing 22. The camera 3 is provided between the second display screen 21 and the second housing 22.

Optionally, the first display screen 11 and the second display screen 21 may be OLED screens with good durability. The OLED screen as a self-luminous screen does not require a backlight, thereby eliminating a backlight panel, so as to reduce the thickness of the display screen and facilitate miniaturization and lightweight development of the electronic device 100. Certainly, the present disclosure is not limited thereto. The first display screen 11 and the second display screen 21 may be Mini LED screens or Micro LED screens.

In some embodiments of the present disclosure, a damping rubber strip is provided between the first display screen 11 and an inner side wall of the first housing 12 and/or between the second display screen 21 and an inner side wall of the second housing 22. By providing the damping rubber strip, when the electronic device 100 falls, collision between the display screen and the housing can be reduced, and a damping function can be realized, thereby protecting the display screen and improving a fall protection effect of the electronic device 100. Additionally, the damping rubber strip can enhance a sealing effect of the display screen and the housing, and have a waterproof and dustproof function.

It should be noted that "the electronic device 100" in the present disclosure includes but is not limited to devices for receiving/transmitting a communication signal via a wired line connection (for example, via Public Switched Telephone Network (PSTN), Digital Subscriber Line (DSL), a digital cable, direct cable connection, and/or another data connection/network) and/or via a wireless interface (for example, cellular networks, wireless local area networks (WLANs), digital television networks (such as DVB-H networks), satellite networks, AM-FM broadcast transmitters, and/or another communication electronic device 100). Communication electronic devices 100 that are arranged to communicate via wireless interfaces may be referred to as "wireless communication devices," "wireless devices," and/or "mobile devices." Examples of mobile devices include, but are not limited to, satellite or cellular telephones; personal communication system (PCS) devices that may combine cellular radiotelephone with data processing, fax, and data communication capabilities; PDAs that may include radiotelephones, pagers, Internet/Intranet access, web browsers, memo pads, calendars, and/or global positioning system (GPS) receivers; and conventional laptop and/or palmtop receivers or other electronic devices 100 including radiotelephone transceivers.

Figure 5:
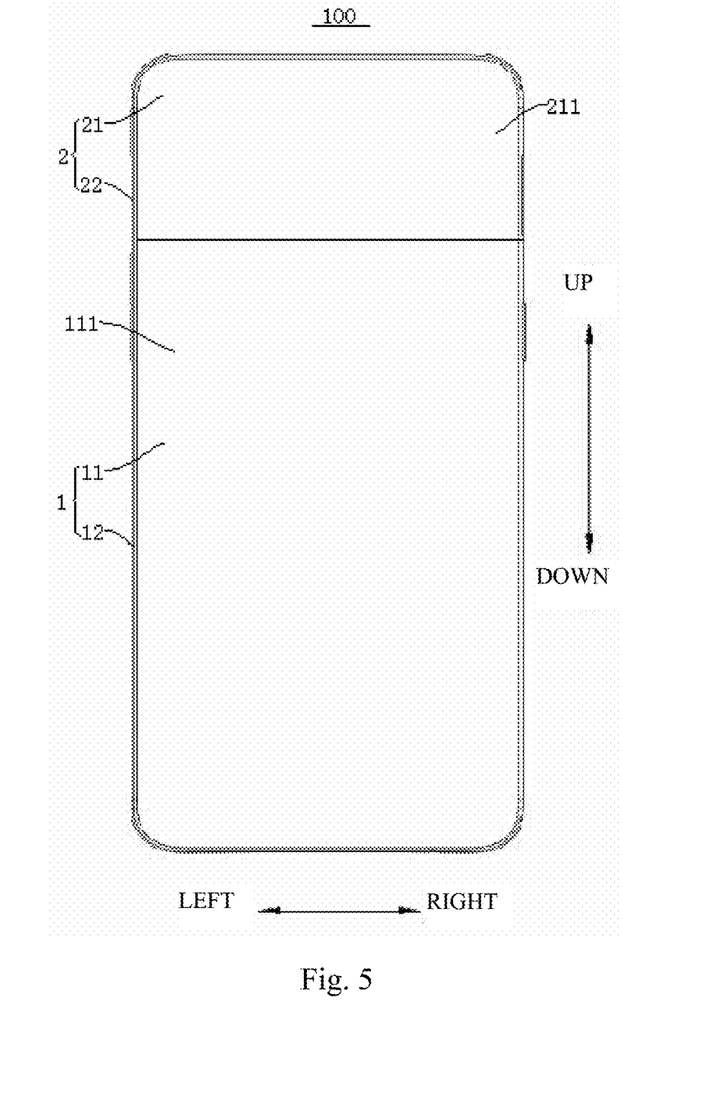
FIG. 5 illustrates a front view of a mobile phone according to an embodiment of the present disclosure.
Figure 6:
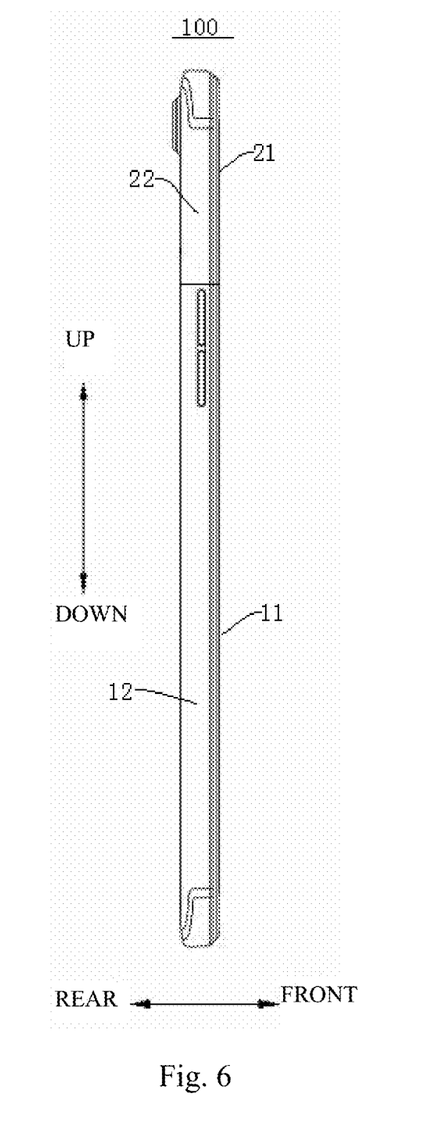
FIG. 6 illustrates a left view of a mobile phone according to an embodiment of the present disclosure.

In an embodiment of the present disclosure, as illustrated in FIGS. 5-6, the electronic device 100 is a mobile phone. Further, the mobile phone may further include a radio frequency circuit, a memory, an input unit, a wireless fidelity (Wi-Fi) module, a sensor, an audio circuit, a processor, a fingerprint identification component, a power source, and the like.

The radio-frequency circuit may be used to receive and transmit a signal during information transmission and reception or during a call. Especially, when downlink information from a base station is received, the RF circuit sends the downlink information to the processor for processing, and additionally sends uplink data from the mobile phone to the base station. Usually, the RF circuit includes but is not limited to an antenna, at least one amplifier, a transceiver, a coupler, a low-noise amplifier, a duplexer and etc. In addition, the RF circuit can communicate with the network and other devices via wireless communication. The wireless communication can employ any communication standard or protocol, including but not limited to global system for mobile communication (GSM), general packet radio service (GPRS), code division multiple access (CDMA), wideband code division multiple access (WCDMA), long term evolution (LTE), e-mail and short messaging service (SMS).

The memory may be used to store software programs and modules, and the processor runs various function applications in the mobile phone and performs data processing by running the software programs and modules stored in the memory. The memory mainly includes a program storage area and a data storage area. The program storage area can store an operating system, at least one application program required for a function (such as a voice playback function, an image playback function and etc.); the data storage area can store data (such as audio data, contacts and etc.) created according to the use of the mobile phone. In addition, the memory may include a high-speed random access memory, and may also include a non-volatile memory, such as at least one disk storage device, a flash memory device, or other volatile solid-state memory devices.

The input unit may be configured to receive incoming numbers or character information, and generate a key signal related to user settings and function control of the mobile phone. Specifically, the input unit may include a touch panel and other input devices. The touch panel, also known as a touch screen, can collect a touch operation made by a user on or near the touch panel (for example, an operation made by the user on the touch panel or near the touch panel by means of a finger, a touch pen or any other suitable object or accessory), and drive the corresponding connection device according to a preset program. Optionally, the touch panel may include a touch detection device and a touch controller. The touch detection device is configured to detect a touch orientation of the user, detect a signal from the touch operation, and transmit the signal to the touch controller. The touch controller is configured to receive the touch information from the touch detection device, convert it into contact coordinates and send the contact coordinates to the processor, and also configured to receive and execute a command from the processor. In addition, it is possible to realize the touch panel in resistive type, capacitive type, infrared type, surface acoustic wave type and other types. The input unit may include other input devices apart from the touch panel. Specifically, other input devices may include, but are not limited to one or more of a physical keypad, a function key (e.g. a volume control button, an on/off button, etc.), a trackball, a mouse and an operating rod.

Wi-Fi is a short-distance wireless transmission technology, and the electronic device 100 can help the user to send and receive e-mails, browse websites, and access streaming media by means of the Wi-Fi module which provides the user with wireless broadband access to the Internet. However, it could be understood that the Wi-Fi module is not a necessary component of the electronic device 100 and can be omitted as needed without changing the nature of the present disclosure.

In addition, the mobile phone may also include at least one sensor, such as an attitude sensor, a light sensor and other sensors.

Specifically, the attitude sensor may also be referred to as a motion sensor, and as one kind of motion sensor, a gravity sensor can be employed. As for the gravity sensor, a cantilever displacement device is made of an elastic-sensitive element, and an electrical contact is driven by an energy-storage spring made of the elastic-sensitive element, so as to achieve the conversion of gravity changes into electrical signal changes.

As an alternative motion sensor, an accelerometer sensor may be used. The accelerometer sensor can detect the magnitude of acceleration in all directions (generally in three axes), and detect the magnitude and direction of the gravity at rest, and can be used for applications requiring attitude identification of the mobile phone (such as horizontal and vertical screen switch, related games, magnetometer attitude calibration), and vibration-recognition related functions (such as pedometer and percussion).

In the embodiments of the present disclosure, the motion sensors listed above may be used as an element for obtaining an "attitude parameter" described later, which is not limited thereto, however. Other sensors capable of obtaining the "attitude parameter" fall into the protection scope of the present disclosure, for example, a gyroscope. The working principle and data processing of the gyroscope may be similar to those in the related art, so the detailed description thereof will be omitted to avoid redundancy.

In addition, in the embodiments of the present disclosure, a barometer, a hygrometer, a thermometer, an infrared sensor or the like may be used as a sensor, which will not be described in detail.

The light sensor may include an ambient light sensor and a proximity sensor, in which the ambient light sensor can adjust brightness of the display panel in accordance with the ambient light, and the proximity sensor can turn off the display panel and/or the backlight when the mobile phone is moved to the ear.

The audio circuit, the loudspeaker and the microphone can provide an audio interface between the user and the mobile phone. The audio circuit can transmit an electrical signal converted from the received audio data to the loudspeaker, and the loudspeaker converts the electrical signal into an audio signal to be output. On the other hand, the microphone converts the collected audio signal into the electrical signal, and the audio circuit receives and converts the electrical signal into audio data, and transmits the audio data to the processor. After processed by the processor, the audio data is sent to, for example, another mobile phone via the RF circuit, or is output to the memory for further processing.

The processor is a control center of the electronic device 100 and mounted on a circuit board assembly. The processor is coupled to various parts of the electronic device 100 by means a variety of interfaces and lines, and performs various functions of the electronic device 100 and data processing by running or executing software programs and/or modules stored in the memory and by invoking the data stored in the memory, so as to monitor the electronic device 100 overall. Optionally, the processor can include one or more processing units. Preferably, the processor may be integrated with an application processor and a modem processor, in which the application processor mainly handles the operating system, the user interface and the application program, while the modem processor mainly deals with wireless communication.

The power source may be logically coupled to the processor by means of a power management system, to manage functions such as charging, discharging, and power management by means of the power management system. Although not shown, the electronic device 100 may also include a Bluetooth module, and a sensor (such as an attitude sensor, a light sensor and other sensors like a barometer, a hygrometer, a thermometer and an infrared sensor), which will not be described herein.

It could be understood that the mobile phone is only an example of the electronic device 100, and the present disclosure is not limited thereto. For example, the electronic device 100 of the present disclosure can be a tablet computer.

It should be noted that all the technical features (including the technical features described in different embodiments) described in the present disclosure can be freely combined in a reasonable situation, and new technical solutions formed by the combination are all included in the protection scope of the present disclosure.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been illustrated and described, it would be appreciated by those skilled in the art that changes, modifications, alternatives and variants can be made in the embodiments without departing from principles and purposes of the present disclosure. The protection scope of the present disclosure is defined by the claims or the like.

What is claimed is:

1. An electronic device, comprising:
    a first display screen assembly comprising a first display portion configured to provide display information; and
    a second display screen assembly comprising a second display portion configured to provide display information, the second display screen assembly being coupled with the first display screen assembly and being movable between a first position where a front side of the second display portion faces forwards and constitutes a display zone together with the first display portion to provide display information, and a second position where a rear side of the second display portion faces forwards, the first display screen assembly and the second display screen assembly being not overlapped in a front-rear direction when the second display screen assembly moves between the first position and the second position,
    wherein the second display screen assembly is rotatably coupled to an outer peripheral wall of the first display screen assembly about a normal direction of the outer peripheral wall of the first display screen assembly, so as to be movable between the first position and the second position,
    wherein the electronic device further comprises a connecting member extending along the normal direction of the outer peripheral wall of the first display screen assembly, the first display screen assembly and the second display screen assembly are coupled by means of the connecting member, and
    wherein the connecting member has an accommodated state where the connecting member is accommodated in the first display screen assembly and/or the second display screen assembly, and an exposed state where the connecting member is exposed from the first display screen assembly and the second display screen assembly; in the accommodated state, the first display screen assembly and the second display screen assembly are spliced together; and in the exposed state, the first display screen assembly is spaced apart from the second display screen assembly.

2. The electronic device according to claim 1, further comprising:
    a camera provided to the second display screen assembly and located at the rear side of the second display portion, the camera moving along with the movement of the second display screen assembly between the first position and the second position, so as to capture images of different regions.

3. The electronic device according to claim 2, wherein a lens of the camera is arranged facing away from the second display portion.

4. The electronic device according to claim 2, wherein a lens of the camera is arranged towards the second display portion.

5. The electronic device according to claim 4, wherein an area of the second display portion opposite to the lens has a higher transmittance than the remaining part.

6. The electronic device according to claim 1, wherein:
    the connecting member comprises a first fitting segment and a second fitting segment coupled with each other, the first fitting segment is coupled with the first display screen assembly, and the second fitting segment is coupled with the second display screen assembly;
    the first display screen assembly is provided with a first fitting groove, and the first fitting segment is slidably fitted in the first fitting groove; and
    the second display screen assembly is provided with a second fitting groove and the second fitting segment is slidably fitted in the second fitting groove, such that the connecting member can be switched between the accommodated state and the exposed state.

7. The electronic device according to claim 6, wherein the first fitting groove is provided with an internal thread, and the first fitting segment is provided with an external thread meshing with the internal thread.

8. The electronic device according to claim 6, wherein the second fitting groove is provided with an internal thread, and the second fitting segment is provided with an external thread meshing with the internal thread.

9. The electronic device according to claim 1, wherein the connecting member comprises a first fitting segment and a second fitting segment coupled with each other, the first fitting segment is coupled with the first display screen assembly, and the second fitting segment is coupled with the second display screen assembly; one of the first fitting segment and the second fitting segment is telescopically embedded in the other of the first fitting segment and the second fitting segment, such that the connecting member can be switched between the accommodated state and the exposed state.

10. The electronic device according to claim 1, wherein the connecting member is rotatable with respect to at least one of the first display screen assembly and the second display screen assembly.

11. The electronic device according to claim 10, further comprising a drive motor coupled with the connecting member to drive the connecting member to rotate.

12. The electronic device according to claim 1, wherein the second display screen assembly is provided above or below the first display screen assembly.

13. The electronic device according to claim 1, wherein the second display screen assembly is provided at a left side or at a right side of the first display screen assembly.

14. The electronic device according to claim 1, wherein the first display screen assembly comprises:
a first display screen having the first display portion; and
a first housing, the first display screen being assembled in the first housing.

15. The electronic device according to claim 1, wherein the second display screen assembly comprises:
a second display screen having the second display portion; and
a second housing, the second display screen being assembled in the second housing, and the camera being provided between the second display screen and the second housing.

16. The electronic device according to claim 1, wherein one of the first display screen assembly and the second display screen assembly is formed as one of a closed ring structure and a notched ring structure, and is provided around an outer peripheral wall of the other of the first display screen assembly and the second display screen assembly.

17. An electronic device, comprising:
a first display screen assembly comprising a first display portion configured to provide display information; and
a second display screen assembly comprising a second display portion configured to provide display information, the second display screen assembly being coupled with the first display screen assembly,
wherein the second display screen assembly is movable with respect to the first display screen assembly between a first position where the second display portion has a first orientation identical to an orientation of the first display portion to constitute a display zone of the electronic device, and a second position where the second display portion has a second orientation opposite to the orientation of the first display portion; the first display screen assembly and the second display screen assembly are not overlapped along the orientation of the first display portion when the second display screen assembly moves between the first position and the second position,
wherein the second display screen assembly is rotatably coupled to an outer peripheral wall of the first display screen assembly about a normal direction of the outer peripheral wall of the first display screen assembly, so as to be movable between the first position and the second position,
wherein the electronic device further comprises a connecting member extending along the normal direction of the outer peripheral wall of the first display screen assembly, the first display screen assembly and the second display screen assembly are coupled by means of the connecting member, and
wherein the connecting member has an accommodated state where the connecting member is accommodated in the first display screen assembly and/or the second display screen assembly, and an exposed state where the connecting member is exposed from the first display screen assembly and the second display screen assembly; in the accommodated state, the first display screen assembly and the second display screen assembly are spliced together; and in the exposed state, the first display screen assembly is spaced apart from the second display screen assembly.

18. An electronic device, comprising:
a first display screen assembly comprising a first display screen, the first display screen having a first display portion; and
a second display screen assembly comprising a second display screen, the second display screen having a second display portion, the second display screen assembly being coupled with the first display screen assembly,
wherein the second display screen assembly is movable with respect to the first display screen assembly between a first position where the second display screen has a first orientation identical to an orientation of the first display screen so as to enable the first display portion and the second display portion to cooperatively constitute a display zone of the electronic device, and a second position where the second display screen has a second orientation opposite to the orientation of the first display screen; the first display screen assembly and the second display screen assembly are not overlapped along the orientation of the first display screen when the second display screen assembly moves between the first position and the second position,
wherein the second display screen assembly is rotatably coupled to an outer peripheral wall of the first display screen assembly about a normal direction of the outer peripheral wall of the first display screen assembly, so as to be movable between the first position and the second position,
wherein the electronic device further comprises a connecting member extending along the normal direction of the outer peripheral wall of the first display screen assembly, the first display screen assembly and the second display screen assembly are coupled by means of the connecting member, and
wherein the connecting member has an accommodated state where the connecting member is accommodated in the first display screen assembly and/or the second display screen assembly, and an exposed state where the connecting member is exposed from the first display screen assembly and the second display screen assembly; in the accommodated state, the first display screen assembly and the second display screen assembly are spliced together; and in the exposed state, the first display screen assembly is spaced apart from the second display screen assembly.

* * * * *